J. MILLER, Jr.
Nut-Lock Washers.

No. 158,962. Patented Jan. 19, 1875.

Witnesses
John Becker
Fred Haynes

John Miller Junr
by his Attorneys
Brown & Allen

UNITED STATES PATENT OFFICE.

JOHN MILLER, JR., OF SYRACUSE, NEW YORK.

IMPROVEMENT IN NUT-LOCK WASHERS.

Specification forming part of Letters Patent No. 158,962, dated January 19, 1875; application filed November 21, 1874.

*To all whom it may concern:*

Be it known that I, JOHN MILLER, Jr., of Syracuse, in the county of Onondaga and State of New York, have invented a new and useful Improvement in Nut-Lock Washers; and I do hereby declare that the following is a full, clear, and exact description thereof, reference being had to the accompanying drawing, forming part of this specification.

My invention consists in an elastic washer of novel construction, composed of two parts of metal having between them a rubber or other elastic substance, a portion of the face of the washer corresponding to the size of the nut, and upon which the nut rests when screwed down, being flat, and the other portion of the face being curved in the form of double inclined planes, over which the corners of the nut pass and bear while the nut is being screwed down or unscrewed, the washer being compressed by the passage of the corners of the nut over said curved portions, and expanding by means of the rubber when the nut comes over the flat surface above described, whereby the curved portions are brought above the under side of the nut, and prevent it from working loose.

The invention is particularly intended for application to railroad-rail joints; but it may be used in various other situations where bolts and nuts are employed.

Figure 1:
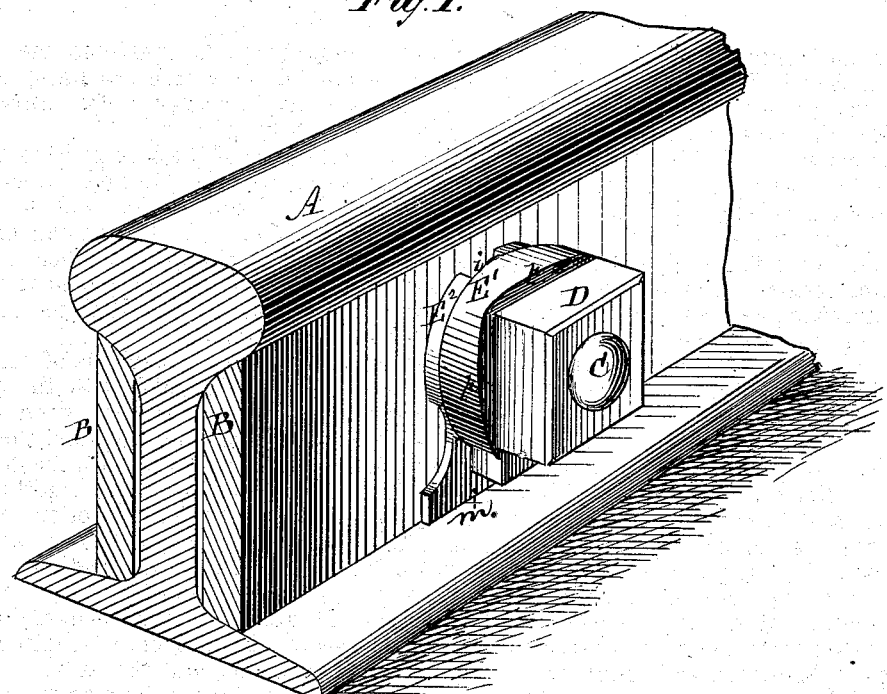
Figure 2:
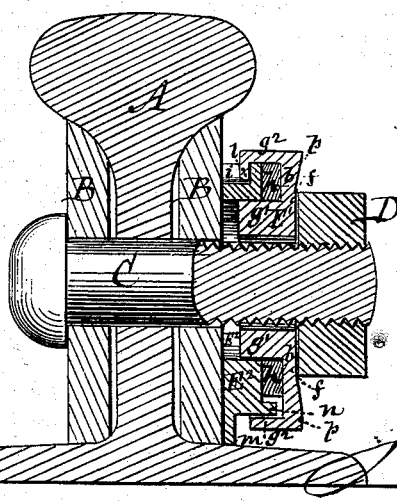

In the accompanying drawing, Figure 1 is a perspective view, showing my invention as applied to a rail-joint. Fig. 2 is a sectional view.

A represents a portion of a railroad-rail, having a fish-plate, B, on each side, and a screw-bolt, C, passing through the same, with a nut, D, on the end thereof. These parts are all of ordinary construction.

Between the nut D and the fish-plate is the elastic washer, which is composed of two halves or sections, $E^1$ $E^2$. The outer section, $E^1$, is of circular or approximate form, and in its outer face is a flat central portion, $f$, of corresponding form and size with the nut, upon which flat surface the nut rests when screwed down. The portion of the outer surface which surrounds the flat surface $f$ is curved in the form of double inclined planes $p$, over which the corners of the nut ride when it is being screwed down or unscrewed.

As the same force to overcome the curve has to be applied either in screwing up or unscrewing the nut, the latter is effectually prevented from working loose.

On the inner face of the section $E^1$ is an annular groove or recess, $b$, formed by the hub or inner rim, $g^1$, of the section and the outer edge, $g^2$, of the same. In this annular groove or recess is placed a ring, $h$, of rubber or other elastic substance, which is protected from being compressed into the thread of the bolt by the hub or inner rim, $g^1$.

The section $E^2$ of the washer is of annular form, corresponding in width with the annular groove, so as to fit the same snugly, but not too tightly. It is placed against the elastic ring $h$, so as to hold it in place in the groove, and the sections are secured together by means of lugs $l$ on the outer section, turned down and engaging with notches or recesses $i$ in the inner side of the inner section.

A jog or projection, $n$, on the side of the projection $E^2$, fitting in a corresponding recess in the section $E^1$, prevents the latter from turning with the nut, and the entire washer is prevented from turning by a square-edged projection, $m$, resting against the foot or head of the rail; or, where several washers are placed near together, they may be prevented from turning by means of a bar connecting them, or by any other suitable means.

When the nut D is screwed down upon the washer, the elasticity of the ring $h$ has a tendency to separate the two sections $E^1$ $E^2$, pressing the outer section, $E^1$, in an outward direction, so as to cause the engagement of the nut with the flat portion $f$, and bringing the curved sides above the under side of the nut, and thus the nut is effectually prevented from turning.

What I claim as new, and desire to secure by Letters Patent, is—

The elastic nut-lock washer made of the two box-like parts $E^1$ and $E^2$, and interposed elastic piece $h$, the part E having its outer face constructed with the flat central portion $f$ and double inclined planes $p$, substantially as and for the purpose shown and described.

J. MILLER, JR.

Witnesses:
MICHAEL RYAN,
FRED. HAYNES.